US012359148B2

(12) United States Patent
Oh et al.

(10) Patent No.: US 12,359,148 B2
(45) Date of Patent: Jul. 15, 2025

(54) SOLUBLE LAUNDRY SHEET COMPRISING POLYOL OR METAL ION CHLORIDE

(71) Applicant: LG HOUSEHOLD & HEALTH CARE LTD., Seoul (KR)

(72) Inventors: Kyung-Hoon Oh, Seoul (KR); Min-Seok Cho, Seoul (KR)

(73) Assignee: LG HOUSEHOLD & HEALTH CARE LTD., Seoul (KR)

( * ) Notice: Subject to any disclaimer, the term of this patent is extended or adjusted under 35 U.S.C. 154(b) by 462 days.

(21) Appl. No.: 17/595,870

(22) PCT Filed: May 28, 2020

(86) PCT No.: PCT/KR2020/006949

§ 371 (c)(1),
(2) Date: Nov. 29, 2021

(87) PCT Pub. No.: WO2020/242233

PCT Pub. Date: Dec. 3, 2020

(65) Prior Publication Data

US 2022/0235297 A1 Jul. 28, 2022

(30) Foreign Application Priority Data

May 28, 2019 (KR) ........................ 10-2019-0062786

(51) Int. Cl.
*C11D 17/00* (2006.01)
*C11D 1/14* (2006.01)
(Continued)

(52) U.S. Cl.
CPC ............ *C11D 17/044* (2013.01); *C11D 1/146* (2013.01); *C11D 3/046* (2013.01); *C11D 3/10* (2013.01);
(Continued)

(58) Field of Classification Search
CPC .................................................... C11D 17/044
See application file for complete search history.

(56) References Cited

U.S. PATENT DOCUMENTS 8,785,361 B2 * 7/2014 Sivik ...................... H04L 65/65 510/444
10,781,412 B2 9/2020 Shin
(Continued)

FOREIGN PATENT DOCUMENTS

CN 107201279 A 9/2017
CN 107418741 A 12/2017
(Continued)

OTHER PUBLICATIONS

The Notice of Allowance on Sep. 30, 2024 in regard to the Japanese Patent Application No. 2021-570513, 5 pages with translation.

*Primary Examiner* — Necholus Ogden, Jr.
(74) *Attorney, Agent, or Firm* — Vorys, Sater, Seymour and Pease LLP; Mih Suhn Koh

(57) ABSTRACT

The present invention provides a water-soluble laundry sheet comprising a detergent ingredient for laundry, a water-soluble film-forming polymer, and an alkali binder, wherein the laundry sheet comprises any one or more selected from the group consisting of polyols and metal ion chlorides. The present invention provides a water-soluble laundry sheet with enhanced formulation stability, storage stability, and sheet solubility.

13 Claims, 4 Drawing Sheets

(51) Int. Cl.

| | |
|---|---|
| ***C11D 3/04*** | (2006.01) |
| ***C11D 3/10*** | (2006.01) |
| ***C11D 3/22*** | (2006.01) |
| ***C11D 3/37*** | (2006.01) |
| ***C11D 17/04*** | (2006.01) |

(52) U.S. Cl.

CPC ............ *C11D 3/221* (2013.01); *C11D 3/3753* (2013.01); *C11D 2111/12* (2024.01)

(56) References Cited

U.S. PATENT DOCUMENTS

| | | | | |
|---|---|---|---|---|
| 11,447,728 | B2 | 9/2022 | Cho et al. | |
| 2007/0269651 | A1 * | 11/2007 | Denome ............ | C11D 17/0039<br>428/323 |
| 2018/0216285 | A1 | 8/2018 | Pratt et al. | |
| 2019/0194584 | A1 * | 6/2019 | Astete Boettcher ..... | C11D 3/50 |
| 2020/0277555 | A1 | 9/2020 | Cho et al. | |

FOREIGN PATENT DOCUMENTS

| | | | |
|---|---|---|---|
| JP | 1978-091913 | A | 8/1978 |
| JP | 2000-26899 | A | 1/2000 |
| JP | 2000-169896 | A | 6/2000 |
| JP | 2004-18847 | A | 1/2004 |
| JP | 2017/106002 | A | 6/2017 |
| KR | 10-2010-0090122 | A | 8/2010 |
| KR | 10-2012-0127174 | A | 11/2012 |
| WO | 2013/036662 | A1 | 3/2013 |
| WO | 2017/043507 | A1 | 3/2017 |
| WO | 2018/056705 | A1 | 3/2018 |

* cited by examiner

SOLUBLE LAUNDRY SHEET COMPRISING POLYOL OR METAL ION CHLORIDE

TECHNICAL FIELD

The present application claims priority to Korean Patent Application No. 10-2019-0062786 filed on May 28, 2019 in the Republic of Korea, the disclosures of which are incorporated herein by reference. The present disclosure relates to a water-soluble laundry sheet, and particularly provides a water-soluble laundry sheet having improved storage stability, solubility and/or cleaning power.

BACKGROUND ART

In the case of a liquid detergent, it is disadvantageous in that is relatively heavy and consumers are reluctant to use it. In the case of a powder detergent, powder flying occurs during the use thereof. Therefore, there has been a continuous need for a novel type of detergent. There are commercially available sheet-like laundry detergents that are soluble in washing water and improve the disadvantages of powder detergents, liquid detergents, or the like, used as laundry detergents. Such sheet-like laundry detergents are advantageous in that they are thin and light and are convenient to store. However, cleaning power-related problems have been raised occasionally in the case of sheet-like laundry detergents.

To improve such sheet-like laundry detergents, it is required to use a formulating agent. When the amount of a detergent ingredient is increased to improve cleaning power, use of the formulating agent should be reduced. In addition, when use of a formulating agent is increased to form a sheet-like shape, use of a detergent ingredient is reduced. Therefore, it is not easy in the art to accomplish cleaning power and formulation at the same time. In addition, when the amount of a detergent ingredient is increased to improve cleaning power, there is a problem in that the storage stability of the laundry sheet is affected adversely.

Since the amount of a detergent ingredient (such as a surfactant) supported in a water-soluble sheet-like laundry detergent, which retains its shape by the formulating agent, is limited, it is required to incorporate a larger amount of other ingredients, such as a laundry aid, capable of assisting improvement of cleaning power in order to improve cleaning power. It is recognized that the weight of such a laundry aid may adversely affect the storage stability of a water-soluble laundry sheet. Therefore, various studies have been conducted to improve this.

Although a large amount of active ingredients should be incorporated to a water-soluble laundry sheet in order to improve cleaning powder, such an increase in weight of active ingredients may detract from the storage stability of a water-soluble laundry sheet. Therefore, intensive studies have been conducted for a long time in order to obtain a sheet having excellent storage stability and capable of being easily formulated even with a small amount of formulating agent, while including an increased amount of active ingredients.

The dissolution rate of a detergent in washing water during washing affects cleaning power. Particularly, in the case of a sheet-like laundry detergent including a formulating agent, there is a problem in that the detergent is disintegrated slowly due to low solubility and cannot provide a sufficient detergent substance during a washing period, resulting in degradation of cleaning power.

DISCLOSURE

Technical Problem

The present disclosure is designed to solve the problems of the related art, and therefore the present disclosure is directed to providing a water-soluble laundry sheet having improved storage stability and/or dissolution rate.

The present disclosure is also directed to providing a water-soluble laundry sheet capable of being easily formulated even with the use of a small amount of formulating agent, while maintaining or increasing the amount of active ingredients.

In addition, the present disclosure is directed to providing a laundry sheet having improved cleaning power and showing sufficient tensile strength suitable for mass production.

Further, the present disclosure is directed to providing a water-soluble laundry sheet which includes a water-soluble film-forming polymer solidified in the form of a film, wherein a laundry detergent ingredient is distributed among the water-soluble film-forming polymer chains, and a water-soluble laundry sheet further including a polyol in addition to the water-soluble film-forming polymer.

Technical Solution

In one aspect of the present disclosure, there is provided a water-soluble laundry sheet including a laundry detergent ingredient, a water-soluble film-forming polymer and an alkali builder, wherein the water-soluble laundry sheet includes a polyol and/or metal ion chloride. The water-soluble film-forming polymer may be used as a formulating agent for the water-soluble laundry sheet.

The inventors of the present disclosure have recognized first the technical problem about how the storage stability of a sheet-like laundry sheet is improved, while improving the cleaning power of the water-soluble laundry sheet. Thus, the inventors of the present disclosure provide a solution for improving the problem. The inventors of the present disclosure have found that when a polyol is incorporated to a water-soluble laundry sheet, it is possible to improve storage stability and to provide physical properties suitable for mass production, while increasing the amount of a detergent ingredient in the sheet. The present disclosure is based on this finding.

As used herein, the term 'laundry sheet' is referred to as a thin film- or layer-type laundry product having a shape of handkerchief in the art. The laundry sheet may be prepared from a solution formed by mixing a water-soluble polymer with a laundry detergent ingredient, and the method for preparing the same is not particularly limited. To impart a sheet-like shape to the laundry sheet, a formulating agent is used. Preferably, the formulating agent may be a water-soluble film-forming polymer.

The water-soluble laundry sheet may include a water-soluble film-forming polymer. The water-soluble film-forming polymer may be at least one selected from natural, semi-synthetic and synthetic polymers. Particularly, polyvinyl alcohol or a polyvinyl alcohol-based copolymer may be used as a formulating agent. Even when a large amount of laundry active ingredients, such as a high content of surfactant, is incorporated into a matrix formed by the polyvinyl alcohol or polyvinyl alcohol-based copolymer, it is possible to maintain the physical properties, such as tensile strength, of the film, and to incorporate a relatively large amount of surfactant per unit area within the limit of physical properties required for the sheet-like detergent. In the laundry sheet according to the present disclosure, a polymer preferably having a number average molecular weight of 10,000-100,000, more preferably 20,000-50,000, and even more preferably 20,000-30,000, is used among the polyvinyl alcohol or polyvinyl alcohol-based copolymers having different molecular weights and saponification degrees, generally considering film formability, solubility, easy preparation, storage stability, cleaning quality, sheet tensile strength, mass productivity, or the like. The saponification degree may be 65-95%, preferably 68-90%, and more preferably 70-85%. When the saponification degree is less than 65% or larger than 95%, it may not provide sufficient water solubility and sufficient physical properties. In a variant, the polyvinyl alcohol-based copolymer may include a polyvinyl alcohol-based copolymer including an anionic monomer unit having a carboxyl group, and such a copolymer includes a vinyl alcohol monomer unit and an anionic monomer unit represented by the following Chemical Formula 1 or 2, and preferably includes a copolymer having a content of anionic monomer unit of 0.5-5 mol %:

[Chemical Formula 1]

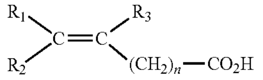

[Chemical Formula 2]

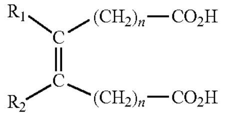

In Chemical Formula 1 and Chemical Formula 2, each of $R_1$, $R_2$ and $R_3$ independently represents H or methyl, and n independently represents an integer of 0-3.

According to the present disclosure, various surfactants, such as a non-ionic surfactant, anionic surfactant and an amphoteric surfactant, may be used as a laundry detergent ingredient for providing a cleaning effect. Preferably, the detergent ingredient may be at least one selected from the group consisting of C8-C18 alkyl sulfate salts represented by the chemical formula of $RSO_4$-$M^+$ (wherein M represents an alkali metal, preferably sodium or potassium, most preferably sodium), more preferably a-olefin sulfonates, sodium lauryl sulfate, sodium lauryl ethoxylated sulfonate, secondary alkane sulfonates and methyl ester sulfonate, and most preferably, the detergent ingredient may include sodium lauryl sulfate as a surfactant. The surfactant is preferred in terms of applicability with the water-soluble film-forming polymer, cleaning power and sheet stability.

In addition, the detergent ingredient may include a nonionic surfactant or amphoteric surfactant. The nonionic surfactant may include polyoxyalkylene alkyl phenyl ether, polyoxyalkylene alkyl ether, polyoxyethylene polyoxypropylene block polymer, polyethylene glycol fatty acid ester, polyoxyethylene sorbitan fatty acid ester, cocoamidomonomethylamine, cocoamidodimethyl amine, cocoamidomonoethylamine, fatty acid alkanolamine, amine oxide, alkyl polyglucoside, methyl polyethylene alkyl ether, sugar ether, or the like, but is not limited thereto. Such nonionic surfactants may be used alone or in combination. Particularly, it is preferred to use polyoxyalkylene alkyl ether represented by the following Chemical Formula 3 or polyoxyalkylene alkyl phenyl ether represented by the following Chemical Formula 4:

$$C_m—H_{2m+1}—O—(CH_2CH_2O)_n—H \qquad \text{[Chemical Formula 3]}$$

$$C_mH_{2m+1}C_6H_5—O—(CH_2CH_2O)_n—H \qquad \text{[Chemical Formula 4]}$$

In Chemical Formula 3 and Chemical Formula 4, m is an integer of 5-21, and n is an integer of 1-20.

In addition, the amphoteric surfactant may include amine oxide, cocoamidopropyl betaine, or the like, but is not limited thereto. Such amphoteric surfactants may be used alone or in combination.

The inventors of the present disclosure have found that a laundry sheet including a water-soluble film-forming polymer and a detergent ingredient uses an alkali builder in order to improve cleaning power due to the low amount of laundry detergent used during washing, but causes the problem of degradation of storage stability and cleaning power due to the interaction among the ingredients used together. Thus, the inventors of the present disclosure have conducted many studies in order to improve the problem. The alkali builder may enhance the cleaning power of the laundry detergent contained in the sheet and may function as a metal ion sequestering agent, a chelating agent, a buffering agent, a diluting agent, a filler, a carrier or a pH modifier.

The laundry sheet according to the present disclosure may further include a laundry aid in order to improve cleaning power and formability without adversely affecting the sheet formulation capability, storage stability and easy preparation. For example, the laundry sheet may further include: a fluorescent brightening agent; an enzyme (e.g. cellulase, protease, or the like); a fiber softening agent (e.g. cationic surfactant based on quaternary ammonium salt, silicone-based fiber softening ingredient); a bleaching agent (e.g. perborate, percarbonate, perphosphate, diacyl, tetraacyl peroxide); a dispersant/emulsifier (e.g. polyoxylalkylene alkyl phenyl ether, polyoxyalkylene alkyl ether, polyoxyethylene polyoxypropylene block polymer); a sterilizing/disinfecting agent (e.g. sodium hypochlorite, hydrogen peroxide, carbamide peroxide); a fragrance; a preservative; a pigment; an antibacterial agent; or the like.

According to an embodiment, the water-soluble laundry sheet may include a water-soluble film-forming polymer, a detergent ingredient and an alkali builder, wherein the water-soluble film-forming polymer may be contained in an amount of 18-38 wt %, preferably 19-35 wt %, based on the total weight of the water-soluble laundry sheet after drying. When the content of the water-soluble film-forming polymer is excessively high, it may not provide to increase the content of active ingredients for imparting a cleaning effect. When the content of the water-soluble film-forming polymer is excessively low, it is difficult to formulate a sheet shape. Within the above-defined content, it is possible to provide the water-soluble laundry sheet with high storage stability, formability, cleaning power and/or solubility and physical properties or tensile strength suitable for mass production.

According to an embodiment of the present disclosure, when the content of the water-soluble film-forming polymer is the same as defined above, the detergent ingredient may be contained in an amount of 30-60 wt %, preferably 40-57 wt %, and more preferably 43-55 wt %, based on the total weight of the water-soluble laundry sheet after drying. When the content of the detergent ingredient is excessively high, it may not obtain excellent sheet formability and storage stability, resulting in the problem of degradation of cleaning power as compared to the laundry sheet right after the initial production. When the content of the detergent ingredient is excessively low, it may not provide to realize a desired cleaning effect. Within the above-defined range of content, it is possible to accomplish the effects of the present disclosure with ease.

The water-soluble laundry sheet according to the present disclosure includes an alkali builder. The alkali builder may be at least one selected from the group consisting of sodium hydroxide, sodium carbonate, sodium hydrogen carbonate, sodium metasilicate, alkaline sodium silicate, neutral sodium silicate, sodium tripolyphosphate, sodium pyrophosphate, sodium borate, sodium aluminosilicate, sodium sesquicarbonate, monoethanolamine (MEA) and triethanolamine (TEA), preferably sodium carbonate. Any type of alkali builder may be used, as long as it is used conventionally in the field of laundry detergent production. The alkali builder may be used in an amount of 1-20 wt %, preferably 5-20 wt %, and more preferably 5-10 wt %, based on the total weight of the dried water-soluble laundry sheet.

The polyol may include at least one selected from the group consisting of erythritol, xylitol, mannitol, arabitol and sorbitol, preferably sorbitol. The polyol may be used in an amount of 5-20 wt %, preferably 10-20 wt %, more preferably 12-18 wt %, and more preferably 13-17 wt %, based on the total weight of the dried water-soluble laundry sheet. Within the above-defined content, it is possible to improve the sheet storage stability, formability, cleaning power and/or solubility, while providing physical properties and tensile strength suitable for mass production.

It is thought that the polyol reduces the reactivity of polyvinyl alcohol to improve the storage stability of the sheet and to enhance the formability into a sheet, but the scope of the present disclosure is not limited thereto.

According to an embodiment of the present disclosure, the water-soluble laundry sheet may include the water-soluble film-forming polymer and polyol at a ratio of 1.1:1-8:1, preferably 1:2-8:1, and more preferably 1:3-7:1. When the above-defined ratio is not satisfied, stability and formability may be degraded.

According to an embodiment of the present disclosure, the water-soluble laundry sheet may further include a chloride to improve the solubility of the water-soluble laundry sheet, wherein the chloride may be at least one selected from the group consisting of chlorides of Group 1 or Group 2 metals, preferably chlorides with Na, Mg or Ca element, and more preferably NaCl. When the water-soluble laundry sheet including the polyol further includes a chloride, it is possible to dissolve the laundry sheet more rapidly in washing water. The chloride may be used in an amount of 3-7 wt %, preferably 4-6 wt %, based on the total weight of the water-soluble laundry sheet after drying, and may be used at the same amount as the amount of polyol. Within the above-defined range of content, it is possible to improve the solubility of the water-soluble laundry sheet effectively.

According to an embodiment of the present disclosure, there is provided a water-soluble laundry sheet amenable to mass production, while including a small amount of formulating agent. The water-soluble laundry sheet may have a tensile strength of 0.79-3.8 $kgf/cm^2$ as determined by the test instrument of 500 N zwicki, Zwick Roell, at 25° C. A laundry sheet obtained by using a small amount of formulating agent may hardly retain its shape, or may be broken with ease when being separated from a release sheet and wound into a roll shape during mass production. However, the laundry sheet having the above-defined range of tensile strength according to the present disclosure is not broken easily when being wound into a roll shape, and thus is favorable to mass production.

According to an embodiment of the present disclosure, when a metal ion chloride is contained alone without any polyol in the water-soluble laundry sheet, the metal ion chloride may be used in an amount of 1-12 wt %, preferably 2-10 wt %, more preferably 3-10 wt %, and even more preferably 5-10 wt %, based on the total weight of the dried water-soluble laundry sheet. Within the above-defined range of content, it is possible to accomplish the effects of the present disclosure with ease and to assist improvement of the storage stability, formability, cleaning power and solubility of the sheet. Particularly, the sheet including a metal ion chloride shows excellent storage stability and a high dissolution rate in water, and thus provides an excellent cleaning effect.

According to an embodiment of the present disclosure, the water-soluble laundry sheet according to the present disclosure may further include a polyol in combination with the metal ion chloride. The polyol may include at least one selected from the group consisting of erythritol, xylitol, mannitol, arabitol and sorbitol, preferably sorbitol. The polyol may be used in an amount of 5-20 wt %, preferably 10-20 wt %, more preferably 12-18 wt %, and more preferably 13-17 wt %, based on the total weight of the dried water-soluble laundry sheet. Within the above-defined range of content, it is possible to improve the storage stability, formability, cleaning power and/or solubility of the sheet.

It is thought that the polyol reduces the reactivity of polyvinyl alcohol to improve the storage stability of the sheet and to enhance the formability into a sheet, but the scope of the present disclosure is not limited thereto.

The laundry sheet according to an embodiment of the present disclosure includes a laundry detergent ingredient, a water-soluble film-forming polymer, a metal ion chloride and an alkali builder, wherein the laundry detergent ingredient may be used in an amount of 30-60 wt % based on the total weight of the water-soluble laundry sheet after drying, the water-soluble film-forming polymer may be polyvinyl alcohol or a polyvinyl alcohol-based copolymer and may be used in an amount of 18-38 wt % based on the total weight of the water-soluble laundry sheet after drying, the metal ion chloride may be used in an amount of 1-10 wt % based on the total weight of the water-soluble laundry sheet after drying, and the alkali builder may be used in an amount of 1-20 wt % based on the total weight of the water-soluble laundry sheet after drying.

The water-soluble laundry sheet according to the present disclosure may be obtained by dissolving all ingredients required for preparation in a solvent to prepare a blend, and allowing the solvent to evaporate. The solvent may be a solvent that may be used conventionally in the art, preferably water.

The laundry sheet according to an embodiment of the present disclosure includes a laundry detergent ingredient, a water-soluble film-forming polymer, a polyol and an alkali builder, wherein the laundry detergent ingredient may be used in an amount of 30-60 wt % based on the total weight of the water-soluble laundry sheet after drying, the water-soluble film-forming polymer may be polyvinyl alcohol or a polyvinyl alcohol-based copolymer and may be used in an amount of 18-38 wt % based on the total weight of the water-soluble laundry sheet after drying, the polyol may be used in an amount of 5-20 wt % based on the total weight of the water-soluble laundry sheet after drying, and the alkali builder may be used in an amount of 1-20 wt % based on the total weight of the water-soluble laundry sheet after drying.

The water-soluble laundry sheet according to the present disclosure may be obtained by dissolving all ingredients required for preparation in a solvent to prepare a blend, and allowing the solvent to evaporate. The solvent may be a solvent that may be used conventionally in the art, preferably water.

The water-soluble laundry sheet according to the present disclosure may have a dissolution rate of 3 minutes or less, preferably 30 seconds or less, when determined by the test method in the following examples. The water-soluble laundry sheet according to the present disclosure may have higher cleaning power as compared to the known laundry sheets by virtue of such a high dissolution rate.

The water-soluble laundry sheet according to the present disclosure preferably has a thickness of 1 μm to 1 cm, more preferably 5 μm to 0.5 cm, and most preferably 50 μm to 1.5 mm. When the dried laundry sheet has a thickness of less than 1 μm, it may not support active ingredients sufficiently therein, the film shows low strength, and it is difficult to obtain desired quality. When the dried laundry sheet has a thickness of larger than 1 cm, the sheet is dissolved slowly, resulting in degradation of cleaning quality.

The water-soluble laundry sheet according to the present disclosure may be obtained by a process including bubbling. Through the bubbling, the water-soluble laundry sheet may include bubbles in the sheet and/or on the sheet surface.

The laundry sheet according to the present disclosure may be provided as a sheet including two or more layers integrated with each other by stacking one sheet according to the present disclosure with another layer of sheet. The laundry sheet according to the present disclosure may further include a laundry aid, such as an enzyme, a bleaching agent, a bleaching activator, builder, or the like. Such laundry aids may be prepared in the form of granules and may be incorporated into the sheet and/or on the sheet surface.

The present disclosure also provides novel use of a polyol, preferably sorbitol, for improvement of the storage stability, solubility and/or tensile strength of a water-soluble laundry sheet, and such use is not known to date. The use may further include a metal ion chloride.

In addition, the present disclosure provides novel use of a metal ion chloride, preferably sodium chloride, for improvement of the storage stability and solubility of a water-soluble laundry sheet. The use may further include a polyol.

Additionally, the present disclosure provides a novel method for preparing a water-soluble laundry sheet having improved storage stability and solubility and amenable to mass production, the method including adding a polyol, preferably sorbitol, during the preparation of a water-soluble laundry sheet formed by using a laundry detergent ingredient, a water-soluble film-forming polymer and an alkali builder. The method may further include a metal ion chloride.

Further, the present disclosure provides a novel method for preparing a water-soluble laundry sheet having improved storage stability and solubility and amenable to mass production, the method including adding a metal ion chloride, preferably sodium chloride, during the preparation of a water-soluble laundry sheet formed by using a laundry detergent ingredient, a water-soluble film-forming polymer and an alkali builder. The method may further include a polyol.

Advantageous Effects

The water-soluble laundry sheet according to the present disclosure can inhibit reaction between an alkali builder and PVA, can allow retention of the functions of the alkali builder and can minimize degeneration of PVA, and thus can provide excellent cleaning power.

The laundry sheet according to the present disclosure shows excellent storage stability and excellent shape retentivity.

In addition, the present disclosure provides a water-soluble laundry sheet having excellent tensile strength and amenable to mass production despite the use of a small amount of formulating agent.

The laundry sheet according to the present disclosure shows high solubility and allows its detergent ingredient to be disintegrated rapidly in washing water, and thus provides excellent cleaning power.

BRIEF DESCRIPTION OF DRAWINGS

FIG. 1 shows a sheet attached to a release sheet after drying, and FIG. 2 shows a sheet broken upon the detachment from the release sheet after drying. FIG. 1 shows an embodiment illustrating whether the sheet attached to the release sheet can be detached therefrom or not. FIG. 2 shows an embodiment illustrating whether the sheet is broken or not upon the detachment from the release sheet after drying.

FIG. 4 illustrates the result of comparison of storage stability with time for 4 weeks.

The longitudinal axis in each IR graph shows transmittance (%) and the transverse axis thereof shows a wave number ($cm^{-1}$).

MODE FOR INVENTION

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. As used herein, temperature refers to a Celsius temperature (° C.), unless otherwise stated. In the following examples, PVA is JR-05 available from JAPAN VAM & POVAL CO., LTD. The PVA has a saponification degree of 72% and a polymerization degree of 500. The other ingredients are commercially available produces and purchased from the production companies.

1. Manufacture of Soluble Sheet Including Polyol

Manufacture of Soluble Sheet Including Sorbitol

First, a blend was prepared by introducing a formulating agent as a water-soluble film-forming polymer, a polyol, a detergent ingredient, a laundry aid and other ingredients, in turn, to water at 60° C., wherein agitation was carried out at 180 rpm until the introduced ingredients were dissolved completely in each introduction step. Herein, the amount of water was the same as the combined weight of the formulation agent+polyol+detergent ingredient+laundry aid+other agents (50% aqueous solution was prepared).

In the formulation process, the blend was formed into a sheet having a size of 15×25 cm and a thickness of 1.5 mm with a doctor blade, and then the sheet was dried in a drying oven at 125° C. for 12 minutes.

Evaluation of Formulation of Water-Soluble Laundry Sheet

The following test was carried out.

Figure 1:
FIG. 1 and FIG. 2 illustrate a method for evaluating the formulation of a soluble sheet.
Figure 2:
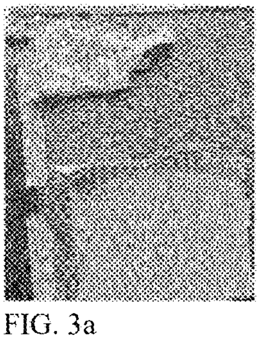
Figure 3A:
FIG. 3*a* illustrates the result of evaluation of stability of a soluble sheet with time. Portion (b) shows a change in content of soda ash right after the preparation, when adding no sorbitol, and portion (a) shows a change in content of soda ash after storing the sheet at room temperature for 4 weeks. After the lapse of 4 weeks, there is a difference in content (Comparative Example 1).
Figure 3B:
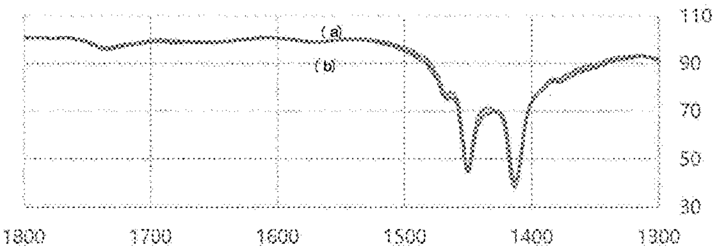
FIG. 3*b* illustrates whether the storage stability of the water-soluble sheet obtained according to Example 8 is improved or not. As determined from the results right after the preparation (b) and after storing the sheet at room temperature for 4 weeks (a), addition of sorbitol can prevent decomposition of soda ash (sodium carbonate).
Figure 3C:
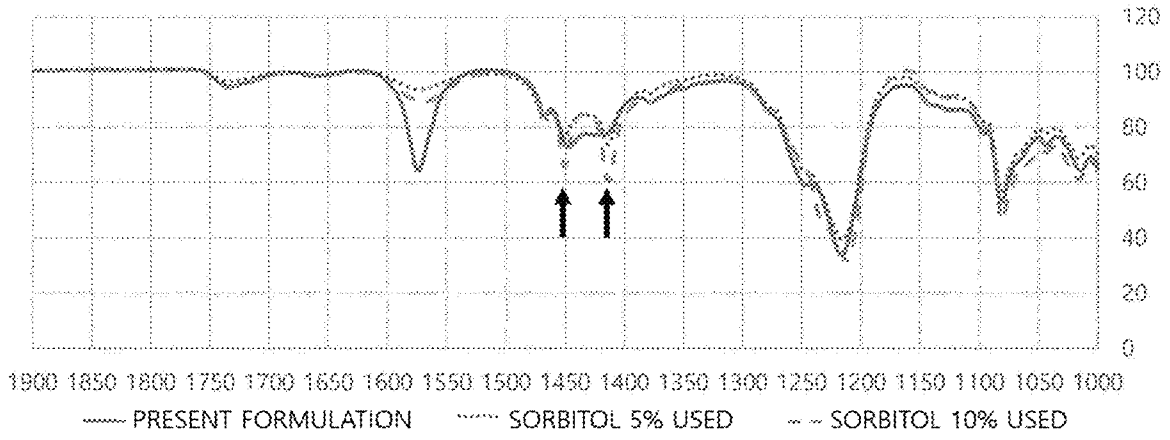
FIG. 3*c* illustrates the result of improvement of the stability of a sheet depending on the content of sorbitol. The two arrow marks show the peaks of soda ash. Addition of sorbitol prevents decomposition of soda ash, which suggests that the sheet detergent has reinforced heat stability.

After each sheet is prepared, it is observed whether the phenomena as shown in FIG. 1 and FIG. 2 occur or not. In other words, each sheet is observed whether or not it is attached to the release sheet after the manufacture to prevent its separation from the release sheet, and then whether or not each sheet is broken upon the detachment from the release sheet.

The test was carried out in a constant-temperature/constant-humidity chamber under the condition of 20° C. and 30%. Each sheet is manufactured five times repeatedly.

When all of the phenomena are not observed, the sheet is evaluated as ‘good’. When the phenomenon as shown in FIG. 1 is observed, the sheet is evaluated as ‘poor’. In addition, both of the phenomena as shown in FIG. 1 and FIG. 2 are observed, the sheet is evaluated as ‘very poor’.

As can be seen from the following test result, a laundry sheet can be formulated even when adding a polyol instead of a formulating agent.

Evaluation of Stability with Time through IR

A water-soluble laundry sheet made by using PVA is problematic in that decomposition of a detergent ingredient and laundry aid is accelerated with time due to the decomposition of PVA. Thus, it is determined whether addition of a polyol improves storage stability or not.

The blend for a laundry sheet having the following composition and prepared as 50% aqueous solution was analyzed by IR spectrometry.

Right after manufacturing the sheet, IR was measured. Then, IR was further measured after storing (20° C., 30%, stored in a package made of PET 16+LLDPE55) the sheet for 4 weeks (test instrument: Perkin Elmer ultra two, constant-temperature/constant-humidity chamber, temperature 20° C., humidity 30%).

In the spectrum, variations at 1410 and 1450 $cm^{-1}$ were observed. The peaks correspond to $CO_3^{2+}$ in $Na_2CO_3$. When the reaction of $Na_2CO_3$+$H_2O$->2NaOH+$CO_2$ proceeds due to the heat and water that are in contact with $Na_2CO_3$ during the storage, $CO_3^{2-}$ is consumed. Therefore, it is thought that the intensity at 1410 and 1450 $cm^{-1}$ is reduced in this case.

When sorbitol is present, it is possible to delay such reduction of $Na_2CO_3$ as an alkali builder.

It can be seen from the above result that the laundry sheet shows highly improved cleaning power.

Soluble Sheet Having Improved Quality by Using Polyol (Sorbitol)

The laundry sheets having the following compositions were manufactured and evaluated.

TABLE 1

| | Comp. Ex. 1 | Comp. Ex. 2 | Ex. 1 | Ex. 2 | Ex. 3 | Ex. 4 | Comp. Ex. 3 | Comp. Ex. 4 | Comp. Ex. 5 | Comp. Ex. 6 |
|---|---|---|---|---|---|---|---|---|---|---|
| Formulating agent (PVA) | 40 | 37 | 35 | 30 | 25 | 23 | 20 | 17 | 15 | 10 |
| Sorbitol | — | 3 | 5 | 10 | 15 | 17 | 20 | 23 | 25 | 30 |
| Detergent ingredient (SLS) | 50 | 50 | 50 | 50 | 50 | 50 | 50 | 50 | 50 | 50 |
| Builder ($Na_2CO_3$) | 7 | 7 | 7 | 7 | 7 | 7 | 7 | 7 | 7 | 7 |
| Enzyme | 2 | 2 | 2 | 2 | 2 | 2 | 2 | 2 | 2 | 2 |
| Others (fragrance, etc.) | 1 | 1 | 1 | 1 | 1 | 1 | 1 | 1 | 1 | 1 |
| Total | 100.0 | 100.0 | 100.0 | 100.0 | 100.0 | 100.0 | 100.0 | 100.0 | 100.0 | 100.0 |

TABLE 1-continued

| | Comp. Ex. 1 | Comp. Ex. 2 | Ex. 1 | Ex. 2 | Ex. 3 | Ex. 4 | Comp. Ex. 3 | Comp. Ex. 4 | Comp. Ex. 5 | Comp. Ex. 6 |
|---|---|---|---|---|---|---|---|---|---|---|
| Formulation | Good | Good | Good | Good | Good | Good | Good | Good | Poor | Poor |
| Mass productivity | Good | Good | Good | Good | Good | Good | Poor | Very Poor | Very Poor | Very Poor |
| Storage stability | Fair | Fair | Good | Very Good | Very Good | Very Good | Very Good | Very Good | Very Good | — |
| Dissolution rate | Fair | Poor | Good | Good | Very Good | Very Good | Very Good | Very Good | Very Good | — |

As shown in the following Table 2, various types of polyols were used to carry out the test.

TABLE 2

| | Ex. 5 | Ex. 6 | Ex. 7 |
|---|---|---|---|
| Formulating agent (PVA) | 25 | 25 | 25 |
| Polyol | 15 | 15 | 15 |
| Detergent ingredient (SLS) | 50 | 50 | 50 |
| Builder ($Na_2CO_3$) | 7 | 7 | 7 |
| Enzyme | 2 | 2 | 2 |
| Others (fragrance, etc.) | 1 | 1 | 1 |
| Total | 100.0 | 100.0 | 100.0 |
| Formulation | Good | Good | Good |
| Remarks | Erythritol is used | Xylitol is used | Sorbitol is used |

It is shown that the sheets obtained by using each of sorbitol, erythritol and xylitol as a polyol can be formulated with ease and shows an effect similar to the effect of sorbitol.

When using a polyol, it is easy to formulate a sheet, even when the content of the formulating agent in the sheet is reduced to at most 23% based on the total weight of the sheet.

It is also shown that when the content of sorbitol is less than at most 20 wt % and the tensile strength is 0.79-3.87 kgf/cm$^2$, the sheet mass productivity is excellent. In addition, when the content of sorbitol is 10-20 wt % based on the total weight of the sheet, the solubility is improved.

Evaluation Result 3 Change in Cleaning Power Depending on Sheet Storage Period (Sorbitol Used Vs. No Sorbitol Used) (Storage Condition 20° C., Humidity 30%)

Figure 4:
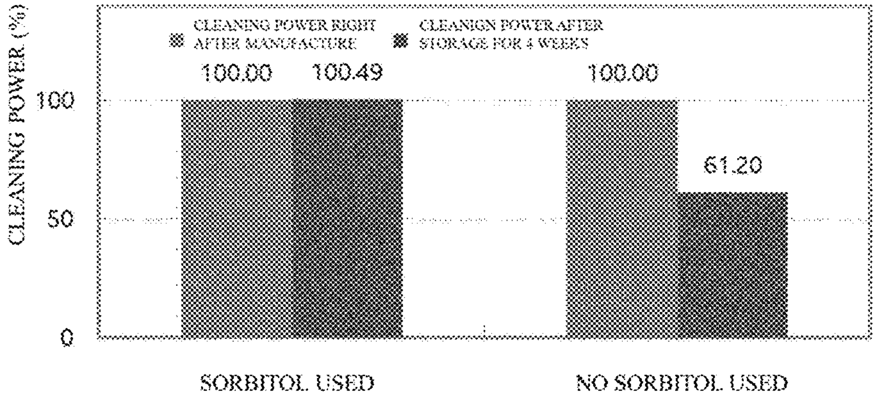
FIG. 4 illustrates the result of comparison of cleaning power depending on the presence of sorbitol. The sheet not including sorbitol shows significant degradation of cleaning power after 4 weeks. In other words.

The cleaning power of the sheet according to Comparative Example 1 was compared with that of the sheet according to Example 3, right after the manufacture of each sheet and after storing each sheet for 4 weeks. The result is shown in FIG. 4.

The cleaning power was evaluated by the following method.

1. Terg-o-tometer, water IL, water temperature 20° C., hardness 50 ppm

2. Used contaminated cloth: Japanese wet contaminated cloth (116, 2 sheets/L)

3. Amount of sample: Standard amount 0.09 g/L

4. The contaminated cloth and a predetermined amount of sample are introduced to IL of water, agitated for 10 minutes and evaluated (each contaminated sheet is evaluated separately).

5. A change in Wb value of each contaminated cloth is determined by using a color difference meter and the cleaning power is calculated by using the Harris formula.

6. The cleaning power right after the manufacture of each sheet is taken as 100 to determine a change in cleaning power.

* The stored sample is stored in a package made of PET16+LLDPE55 for 4 weeks.

$$\text{Cleaning power}(\%) = \frac{\left[(1-R_S)^2/2R_S\right]-\left[(1-R_b)^2/2R_b\right]}{\left[(1-R_S)^2/2R_S\right]-\left[(1-R_0)^2/2R_0\right]}\times 100$$

wherein $R_s$ represents the surface reflectivity of contaminated cloth before washing; $R_b$ represents the surface reflectivity after washing; and $R_D$ represents the surface reflectivity of white cloth.

Referring to FIG. 4, the sheet including 15 wt % of sorbitol according to Example 3 maintains the same cleaning power as the cleaning power upon the initial manufacture, even after storing it for 4 weeks. However, the sheet including no sorbitol shows cleaning power reduced by about 40%.

It is thought that when using sorbitol, storage stability is reinforced to prevent degradation of cleaning power caused by decomposition of soda ash (sodium carbonate), and thus there is no difference in cleaning power between the sheet right after the manufacture and the sheet after the storage at room temperature. However, the scope of the present disclosure is not limited to this theory.

Method for Evaluating Dissolution Rate of Soluble Sheet

Test Method

Each of the samples according to Examples and Comparative Examples was prepared with a size of 6×6×0.12 cm$^3$, water was prepared at 25° C. in a constant-temperature/constant-humidity chamber under the condition of 20° C. and 30%, and then a squared water bath having a size of 25 cm×30 cm was filled with water to a waver level of 5 cm.

Next, each sample was allowed to float in water, and the time required for crumbling without agitation was measured as an average value of five measurements. When the time required for accomplishing dissolution is within 30 seconds, the sheet is evaluated as 'very good'. When the time is 30 seconds to 3 minutes and 3-5 minutes, the sheet is evaluated as 'good' and 'fair', respectively. In addition, when the time is 5-10 minutes and 10 minutes or more, the sheet is evaluated as 'poor' and 'very poor', respectively.

Criteria for judgement of dissolution: When filtering is carried out with a 75 μm filter and the weight of the non-filtered residual detergent is less than 5% based on the total weight of the detergent, the sheet is judged as 'dissolved'.

Figure 5:
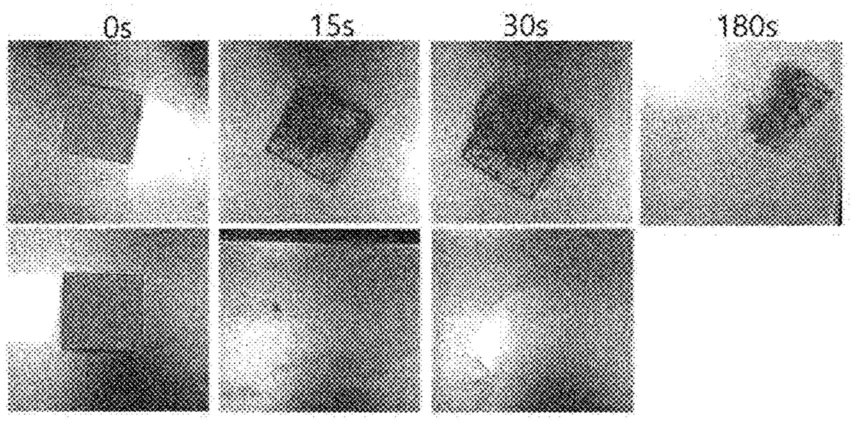
FIG. 5 illustrates the test result of the solubility of a sheet including sorbitol.

The results of Comparative Example 1 and Example 3 are shown in FIG. 5. When using a polyol, dissolution rate is increased significantly. The top view of FIG. 5 illustrates the dissolution rate of the sheet according to Comparative Example 1, and the bottom view illustrates the dissolution rate of the sheet according to Example 3.

Method and Criteria for Evaluating Mass Productivity of Laundry Sheet

Method for Evaluating Mass Productivity

1. After the product is dried in a factory, the product is determined whether it is broken or not upon the separation from the release sheet.

2. When drying 800 kg of a blend and the sheet is wound on a rewinder without failure, the sheet is evaluated as 'good'. When the sheet is broken during rewinding, it is evaluated as 'poor', and when the sheet is broken before rewinding, it is evaluated as 'very poor'.

Method for Evaluating Tensile Strength

1) A sample having a width of 20 mm, length of 60 mm and a thickness of 1.2 mm is prepared.

2) The tensile strength of the sample is measured by using 500N zwicki; Zwick Roell in a constant-temperature/constant-humidity chamber under the condition of 20° C. and 30%.

3) The sample is fixed with an interval between grips of 25 mm, and then the tensile strength is measured by moving the sample at a speed of 500 mm/min until it is broken.

Test Result

TABLE 3

| Content of sorbitol | Tensile strength ($kgf/cm^2$) | Evaluation of mass productivity |
|---|---|---|
| 0% (Comp. Ex. 1) | 2.805 | Good |
| 10% (Ex. 2) | 1.890 | Good |
| 15% (Ex. 3) | 1.595 | Good |
| 20% (Comp. Ex. 3) | 0.825 | Poor |

1. After carrying out the test three times, the average value is recorded.

2. As the content of sorbitol is increased, the tensile strength tends to be decreased.

In addition, the tensile strength is decreased dramatically from a content of sorbitol of 20%.

3. At a content of 20% or less, mass production is allowed without failure during rewinding. When sorbitol is used in an amount of larger than 20%, the sheet is broken before rewinding and during the separation of the sheet, and thus cannot be produced as a commercial product.

Increase in Active Ingredients of Soluble Sheet and Evaluation of Cleaning Power It is determined whether or not the sheet can be formulated and has improved storage stability and solubility even with a small amount of formulating agent, when using sorbitol. Therefore, a change in proportion of active ingredients, a possibility of increasing the amount of active ingredients and a change in cleaning power caused thereby were determined by using sorbitol.

TABLE 4

| | Comp. Ex. 1 | Comp. Ex. 7 | Ex. 8 | Ex. 9 | Ex. 10 | Comp. Ex. 8 |
|---|---|---|---|---|---|---|
| Formulating agent (PVA) | 40 | 45 | 20 | 20 | 20 | 18 |
| Sorbitol | | 15 | 15 | 15 | 15 | 15 |
| Detergent ingredient (SLS) | 50 | 30 | 50 | 52 | 54 | 54 |
| Builder ($Na_2CO_3$) | 7 | 7 | 12 | 10 | 8 | 10 |
| Enzyme | 2 | 2 | 2 | 2 | 2 | 2 |
| Others (fragrance etc., not affecting cleaning power) | 1 | 1 | 1 | 1 | 1 | 1 |
| Total | 100.0 | 100.0 | 100.0 | 100.0 | 100.0 | 100.0 |
| Change in combined weight of detergent ingredient and laundry aid | | −20 | +5 | +5 | +5 | +7 |
| Formulation | Good | Good | Good | Good | Good | Poor |
| Solubility | Fair | Poor | Very Good | Very Good | Very Good | Very Good |
| Storage stability | Fair | Fair | Very Good | Very Good | Very Good | Very Good |
| Cleaning power | — | Decreased as compared to Comp. Ex. 1 | Increased by at most about 30% as compared to Comp. Ex. 1 | Increased by at most about 30% as compared to Comp. Ex. 1 | Increased by at most about 30% as compared to Comp. Ex. 1 | Increased by at most about 30% as compared to Comp. Ex. 1 |

Determination of Change in Cleaning Power

1. Terg-o-tometer, water IL, water temperature 20° C., hardness 50 ppm

2. Used contaminated cloth: Japanese wet contaminated cloth (JIS, 8 sheets/L), w-20D (20D, 8 sheets/L), empa 116 (116, 2 sheets/L), empa-117 (117, 2 sheets/L)

3. Amount of sample: Standard amount 0.09 g/L

4. The contaminated cloth and a predetermined amount of sample are introduced to IL of water, agitated for 10 minutes and evaluated (each contaminated sheet is evaluated separately).

5. A change in Wb value of each contaminated cloth is determined by using a color difference meter and the cleaning power is calculated by using the Harris formula.

$$\text{Cleaning power}(\%) = \frac{[(1-R_S)^2/2R_S] - [(1-R_b)^2/2R_b]}{[(1-R_S)^2/2R_S] - [(1-R_0)^2/2R_0]} \times 100$$

wherein $R_s$ represents the surface reflectivity of contaminated cloth before washing; $R_b$ represents the surface reflectivity after washing; and $R_D$ represents the surface reflectivity of white cloth.

Figure 6:
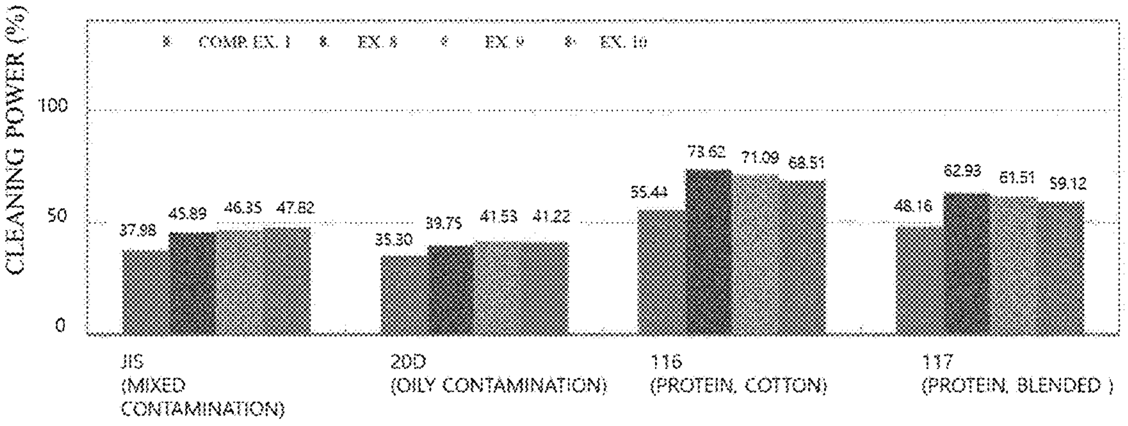
FIG. 6 shows the result of evaluation of cleaning power of a soluble sheet, and illustrates Comparative Example 1, Example 8, Example 9 and Example 10, when viewed from the left side.

When increasing active ingredients, the cleaning power is increased by about 10% or more as compared to the conventional product in all of the contamination cases. Particularly, in the case of contamination with protein, the cleaning power is increased by about 30%. The results are shown in FIG. 6.

Evaluation of Solubility of Water-Soluble Laundry Sheet Including Both Sodium Chloride and Polyol

TABLE 5

| | Ex. 11 |
|---|---|
| Formulating agent (PVA) | 31 |
| Polyol (sorbitol) | 4.5 |
| Chloride (sodium chloride) | 4.5 |
| Detergent ingredient (SLS) | 50 |
| Laundry aid (builder, enzyme, etc.) | 9 |
| Others (fragrance etc.) | 1 |
| Total | 100.0 |
| Formulation | Good |
| Dissolution rate | Very Good |

When using both sorbitol and sodium chloride, the dissolution rate is improved significantly.

2. Manufacture of Soluble Sheet Including Metal Ion Chloride

Manufacture of Soluble Sheet Including Sodium Chloride (Salt)

First, a blend was prepared by introducing a formulating agent as a water-soluble film-forming polymer, a sodium chloride, a detergent ingredient, a laundry aid and other ingredients, in turn, to water at 60° C., wherein agitation was carried out at 180 rpm until the introduced ingredients were dissolved completely in each introduction step. Herein, the amount of water was the same as the combined weight of the formulation agent +sodium chloride+detergent ingredient+ laundry aid+other agents (50% aqueous solution was prepared).

In the formulation process, the blend was formed into a sheet having a size of 15×25 cm and a thickness of 1.5 mm with a doctor blade, and then the sheet was dried in a drying oven at 125° C. for 12 minutes.

Evaluation of Formulation of Water-Soluble Laundry Sheet

The following test was carried out.

After each sheet is prepared, it is observed whether the phenomena as shown in FIG. 1 and FIG. 2 occur or not. In other words, each sheet is observed whether or not it is attached to the release sheet after the manufacture to prevent its separation from the release sheet, and then whether or not each sheet is broken upon the detachment from the release sheet.

The test was carried out in a constant-temperature/constant-humidity chamber under the condition of 20° C. and 30%. Each sheet is manufactured five times repeatedly.

When all of the phenomena are not observed, the sheet is evaluated as 'good'. When the phenomenon as shown in FIG. 1 is observed, the sheet is evaluated as 'poor'. In addition, both of the phenomena as shown in FIG. 1 and FIG. 2 are observed, the sheet is evaluated as 'very poor'.

As can be seen from the following test result, a water-soluble laundry sheet obtained by adding a metal ion chloride shows less problem of adhesion to a release sheet or sheet breakage. In other words, addition of a metal ion chloride positively affects the formulation of a sheet.

TABLE 6

| | Comp. Ex. 9 | Ex. 12 | Ex. 13 | Ex. 14 | Comp. Ex. 10 | Comp. Ex. 11 |
|---|---|---|---|---|---|---|
| Formulating agent (PVA) | 40 | 37 | 35 | 30 | 28 | 25 |
| Metal ion chloride (salt) | | 3 | 5 | 10 | 12 | 15 |
| Detergent ingredient (SLS) | 50 | 50 | 50 | 50 | 50 | 50 |
| Laundry aid (builder) | 7 | 7 | 7 | 7 | 7 | 7 |
| Enzyme | 2 | 2 | 2 | 2 | 2 | 2 |
| Others (fragrance etc., not affect cleaning power) | 1 | 1 | 1 | 1 | 1 | 1 |
| Total | 100.0 | 100.0 | 100.0 | 100.0 | 100.0 | 100.0 |
| Solubility | Fair | Fair | Very Good | Very Good | — | — |
| Formulation | Good | Good | Good | Good | Poor | Poor |
| Storage stability | Fair | Good | Very Good | Very Good | — | — |

Evaluation of Stability with Time through IR

A water-soluble laundry sheet made by using PVA is problematic in that decomposition of a detergent ingredient and laundry aid is accelerated with time due to the decomposition of PVA. Thus, it is determined whether addition of salt improves storage stability or not. The result is shown in FIG. 7.

The blend for a laundry sheet having the following composition and prepared as 50% aqueous solution was analyzed by IR spectrometry.

Right after manufacturing the sheet, IR was measured. Then, IR was further measured after storing (20° C., 30%, stored in a package made of PET 16+LLDPE55) the sheet for 4 weeks (test instrument: Perkin Elmer ultra two, constant-temperature/constant-humidity chamber, temperature 20° C., humidity 70%).

Figure 7:
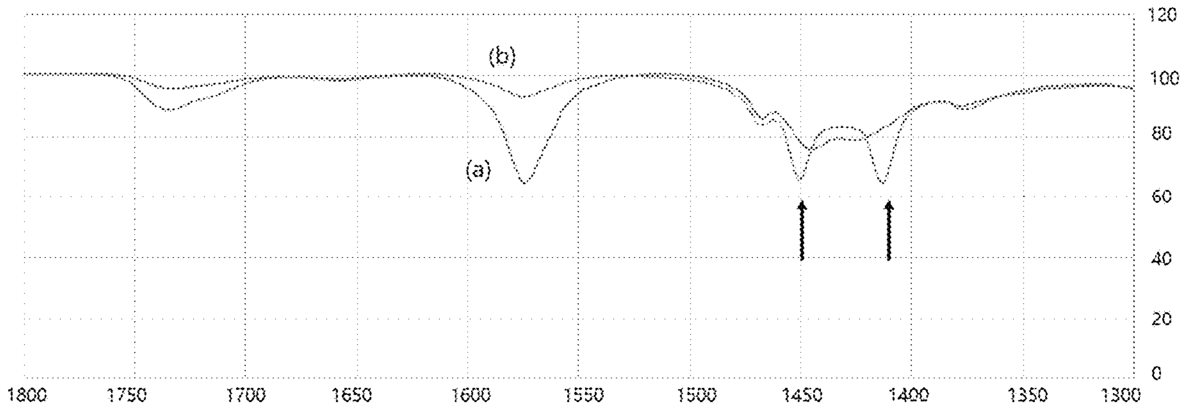
FIG. 7 illustrates IR peaks of a blend for preparing a sheet including sodium chloride (salt) and a sheet not including salt. Portion (a) shows the result of a salt-free blend, and portion (b) shows the result of a blend including 5% of salt. The peak intensity of a laundry active ingredient varies depending on the presence of salt.
Figure 8A:
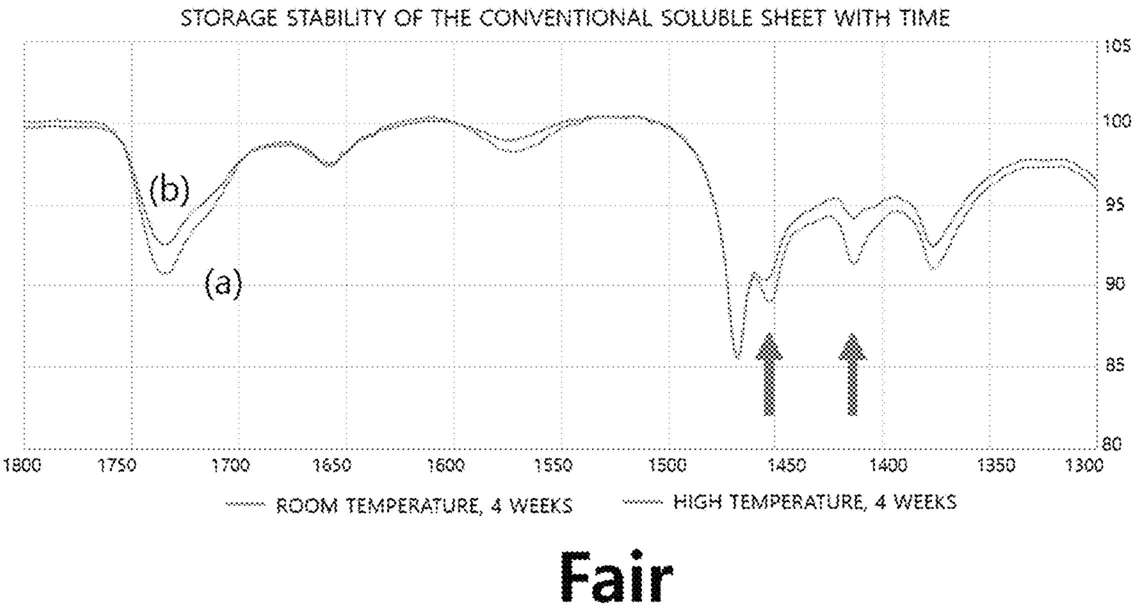
FIG. 8*a* illustrates the result of comparison of the storage stability of a sheet with time for 4 weeks, depending on salt content. When salt is used at 5 wt %, the sheet shows higher storage stability.
Figure 8B:
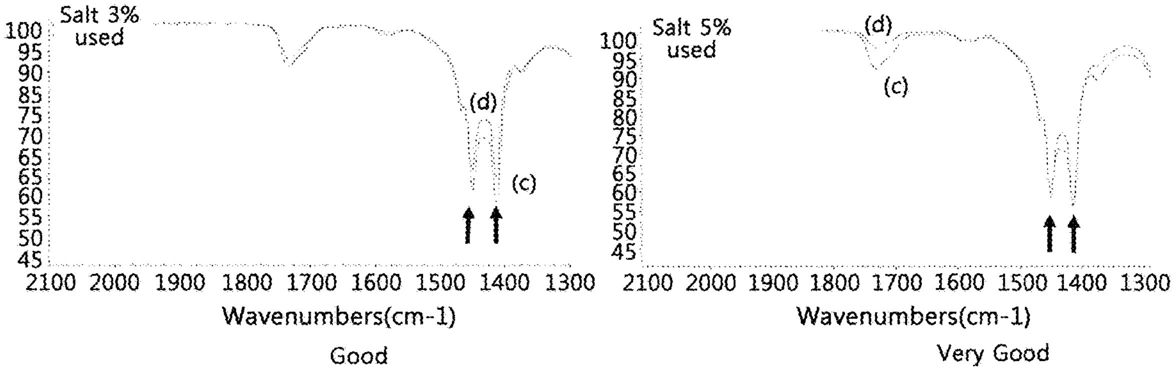
In FIG. 8*b*, blue colored graph (c) shows the initial value, and red colored graph (d) shows the value after the lapse of 4 weeks. As the content of salt is increased, the difference between the blue colored graph and the red colored graph is reduced, wherein a smaller difference between the two graphs suggests improvement of stability.

Referring to the result of FIG. 7, the IR peak of active ingredients causes a change, when salt is added. Particularly, as shown in FIG. 8*a* and FIG. 8*b*, it can be seen that there is little difference in peak of active ingredients, when salt is added in an amount of 5 wt % based on the dry weight of the sheet. Therefore, it can be seen that addition of salt assists stability of active ingredients and enhances improvement of cleaning power.

Method for Evaluating Dissolution Rate of Soluble Sheet

Test Method

Each of the samples according to Examples and Comparative Examples was prepared with a size of 6×6×0.12 $cm^3$, water was prepared at 25° C. in a constant-temperature/constant-humidity chamber under the condition of 20° C. and 70%, and then a squared water bath having a size of 25 cm×30 cm was filled with water to a waver level of 5 cm.

Next, each sample was allowed to float in water, and the time required for crumbling without agitation was measured as an average value of five measurements. When the time required for accomplishing dissolution is within 30 seconds, the sheet is evaluated as 'very good'. When the time is 30 seconds to 3 minutes and 3-5 minutes, the sheet is evaluated as 'good' and 'fair', respectively. In addition, when the time is 5-10 minutes and 10 minutes or more, the sheet is evaluated as 'poor' and 'very poor', respectively.

Criteria for judgement of dissolution: When filtering is carried out with a 75 μm filter and the weight of the non-filtered residual detergent is less than 5% based on the total weight of the detergent, the sheet is judged as 'dissolved'.

Figure 9:
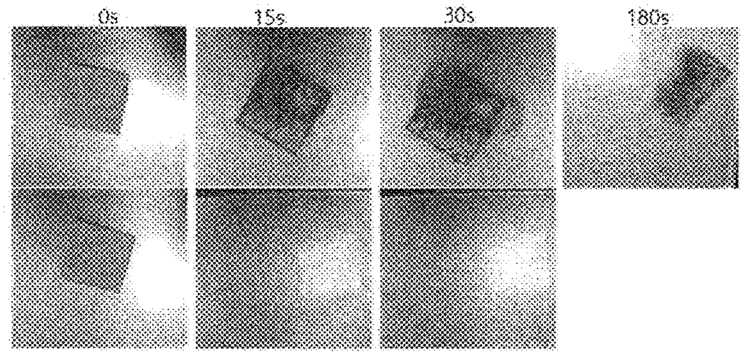
FIG. 9 illustrates the result of evaluation of the solubility of a sheet including salt (bottom, Example 13) and that of a sheet not including salt (top, Comparative Example 9). The sheet including salt, shown at the top, shows higher solubility.

The result is shown in FIG. 9. It can be seen from the result that when a laundry sheet is manufactured by adding 5 wt % of salt, the laundry sheet shows a significantly increased dissolution rate as compared to the sheet including no salt.

Effect of Improving Dissolution Rate Depending on Type of Metal Ion Chloride

To determine how the dissolution rate of a sheet is changed depending on the type of a chloride, the following test was carried out. In the following table, each content is expressed in the unit of wt %.

TABLE 7

| | Ex. 15 | Ex. 16 | Ex. 17 | Comp. Ex. 12 |
|---|---|---|---|---|
| Type | NaCl | $CaCl_2$ | $MgCl_2$ | $Na_2SO_4$ |
| Formulating agent (PVA) | 30 | 30 | 30 | 30 |
| Metal ion chloride | 10 | 10 | 10 | 10 |
| Detergent ingredient (SLS) | 50 | 50 | 50 | 50 |
| Laundry aid (builder) | 7 | 7 | 7 | 7 |
| Enzyme | 2 | 2 | 2 | 2 |
| Others (fragrance etc., not affect cleaning power) | 1 | 1 | 1 | 1 |
| Solubility | Very Good | Good | Good | Fair |
| Formulation | Good | Good | Good | Good |
| Storage stability | Very Good | Very Good | Very Good | Fair |
| Total | 100.0 | 100.0 | 100.0 | 100.0 |

Each of the water-soluble laundry sheets having the compositions as shown in Table 7 was manufactured and evaluated in terms of its dissolution rate according to the above <Method for Evaluating Dissolution Rate of Soluble Sheet>. In the case of the water-soluble laundry sheet (Comparative Example 12) including a sulfate, the sheet is little dissolved even after the lapse of 50 seconds, when being tested according to the above method. On the contrary, it can be seen that each of the water-soluble laundry sheets including a chloride according to Examples 15-17 is dissolved in washing water at a significantly high rate.

INDUSTRIAL APPLICABILITY

The present disclosure provides a sheet-like laundry detergent that is dissolved in water and can be used conveniently. The sheet-like laundry detergent according to the present disclosure shows high solubility and excellent storage stability.

The invention claimed is:

1. The water-soluble laundry sheet consisting of:

i. 30-60 wt. % of the laundry detergent ingredient, ii. 19-38 wt. % of the film forming polymer, iii. 1-20 wt. % of the alkali builder, iv. 5-18 wt. % of the polyol, optionally together with a chloride salt, and v. a remaining wt. % of a laundry aid as a fragrance, an enzyme, a bleaching agent, and/or a bleaching activator.

2. The water-soluble laundry sheet according to claim 1, wherein the detergent ingredient is a C8-C18 alkyl sulfate alkali metal salt.

3. The water-soluble laundry sheet according to claim 1, wherein the detergent ingredient comprises at least one selected from the group consisting of a-olefin sulfonates, sodium lauryl sulfate, sodium lauryl ethoxylated sulfonate, secondary alkane sulfonates and methyl ester sulfonate.

4. The water-soluble laundry sheet according to claim 1, wherein the water-soluble film-forming polymer comprises polyvinyl alcohol or a polyvinyl alcohol-based copolymer.

5. The water-soluble laundry sheet according to claim 4, wherein the polyvinyl alcohol or polyvinyl alcohol-based copolymer has a number average molecular weight of 10,000-100,000 and a saponification degree of 65-95%.

6. The water-soluble laundry sheet according to claim 1, wherein the detergent ingredient is used in an amount of 30-60 wt. % based on the weight of the water-soluble laundry sheet after drying.

7. The water-soluble laundry sheet according to claim 1, wherein the alkali builder is at least one selected from the group consisting of sodium hydroxide, sodium carbonate, sodium hydrogen carbonate, sodium metasilicate, alkaline sodium silicate, neutral sodium silicate, sodium tripolyphosphate, sodium pyrophosphate, sodium borate, sodium aluminosilicate, sodium sesquicarbonate, monoethanolamine (MEA) and triethanolamine (TEA).

8. The water-soluble laundry sheet according to claim 1, wherein the water-soluble laundry sheet further comprises a chloride salt comprises selected from the group consisting of sodium chloride, magnesium chloride, calcium chloride and potassium chloride.

9. The water-soluble laundry sheet according to claim 8, wherein the chloride salt is sodium chloride.

10. The water-soluble laundry sheet according to claim 7, wherein the chloride is used in an amount of 3-7 wt. % based on the total weight of the water-soluble laundry sheet after drying.

11. The water-soluble laundry sheet according to claim 1, which has a tensile strength of 0.79-3.8 kgf/cm2 as determined by the test instrument of 500 N zwicki, Zwick Roell, at 25° C.

12. The water-soluble laundry sheet according to claim 4, wherein the polyvinyl alcohol has a number average molecular weight of 10,000-100,000 and a saponification degree of 65-95%.

13. The water-soluble laundry sheet according to claim 1, wherein the polyol comprises sorbitol.

* * * * *